United States Patent [19]

Kelly et al.

[11] Patent Number: 4,713,054

[45] Date of Patent: Dec. 15, 1987

[54] IMPLANTED MUSCLE POWERED DRUG DISPENSING SYSTEM

[76] Inventors: L. Thomas Kelly; Esther V. M. Hamel, both of Rte. 1, Box 68, St. Ignatius, Mont. 59865; Robert P. Bielka, 2211 N. 59th St., Seattle, Wash. 98103

[21] Appl. No.: 836,010

[22] Filed: Mar. 4, 1986

Related U.S. Application Data

[63] Continuation-in-part of Ser. No. 830,999, Feb. 19, 1986, abandoned.

[51] Int. Cl.$^4$ ............................................. A61M 5/00
[52] U.S. Cl. ..................................... 604/89; 604/152; 604/891; 128/DIG. 12
[58] Field of Search ................... 604/152, 153, 151, 9, 604/89, 182, 212, 66, 65, 67; 128/DIG. 12, 1 R; 417/417

[56] References Cited

U.S. PATENT DOCUMENTS

| | | | |
|---|---|---|---|
| 2,954,028 | 9/1960 | Smith | 604/80 |
| 3,946,734 | 3/1976 | Dedrick et al. | |
| 3,982,537 | 9/1976 | Bucalo | |
| 4,111,102 | 9/1978 | Theeuwes | |
| 4,209,014 | 6/1980 | Sefton | |
| 4,351,337 | 9/1982 | Sidman | |
| 4,360,019 | 11/1982 | Portner et al. | 604/891 |
| 4,457,752 | 7/1984 | Vadasz | |
| 4,487,603 | 12/1984 | Harris | |
| 4,588,394 | 5/1986 | Schulte et al. | 604/9 |
| 4,596,575 | 6/1986 | Rosenberg et al. | 604/891 |

Primary Examiner—Stephen C. Pellegrino
Attorney, Agent, or Firm—Graybeal, Jensen & Puntigam

[57] ABSTRACT

A muscle powered liquid dispensing insert is provided for use with an implanted anchor having a hollow anchor sleeve extending into the subcutaneous fascia of a region behind an animal's ear. The insert includes one or more balloon-like reservoirs, each containing a drug or other medicant in substantially liquid form. Each reservoir means additionally provides effective means for anchoring the insert in the animal. A pump assembly draws the medicant(s) from the reservoir(s), and dispenses such to the animal. The pump assembly has a toroidal pump body defining a pump chamber and including a flexible impermeable pump diaphragm. The pump chamber communicates through inlet check valve means with each of the reservoirs, and through outlet check valve means with the tissue of the animal. The outlet check valve means operate at a higher activation pressure than the inlet check valve means. A piston powered solely by the animal's muscle and tissue operates the pump diaphragm. One or more tubes communicating through the interior of the anchor sleeve between an associated reservoir and a self-sealing opening allow the reservoirs to be refilled. A cap and plug seal the anchor sleeve against the entry of contaminants and other foreign material, and support the self-sealing ends of the tubes. The plug can be removed to allow the insert to be removed from the anchor by means of a suitable tool.

18 Claims, 7 Drawing Figures

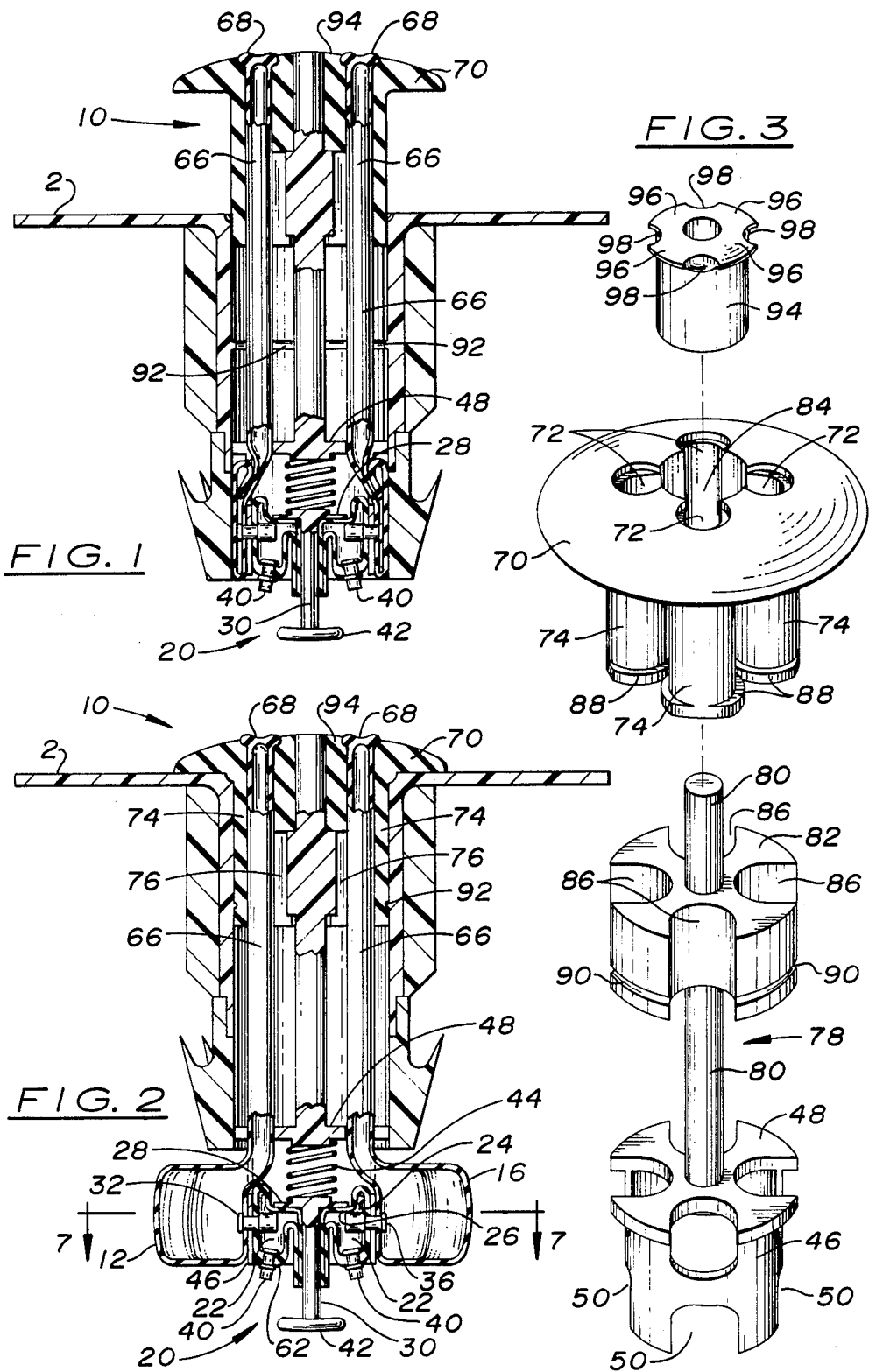

4,713,054

IMPLANTED MUSCLE POWERED DRUG DISPENSING SYSTEM

BACKGROUND OF THE INVENTION

Cross-reference to Related Application

This application is a continuation-in-part of U.S. patent application Ser. No. 830,999, filed on Feb. 19, 1986 now abandoned and entitled IMPLANTED ANCHOR AND INSERT WITH ANALOG DISPLAY.

Technical Field

This invention relates to medical devices for animals, and more particularly to an implanted liquid dispensing device usable in cooperation with an anchor located behind the animal's ear.

Description of the Prior Art

The dispensation of medicants and other drugs into animals has been generally limited to drugs which can be solidified into implantable capsules. Not all drugs can be so administered. Some multiple component drugs, in fact, lose their potency if they are mixed a significant period of time prior to their administration to the animal. Devices which simultaneously mix one or more liquid drugs and administer them by means of a mechanical pumping system can solve many of the problems associated with liquid drugs and other medicants, and especially with binary and other multiple component liquid drugs. Storage and pumping devices which can be implanted in the body are well known in the field of human medicine. One group of conventional implantable devices relies on power sources external to the body in which the device is implanted. Examples of these externally powered devices are found in Sefton U.S. Pat. No. 4,209,014 and Vadasz U.S. Pat. No. 4,457,752. Externally powered implanted devices suffer from the serious disadvantage of being unable to operate away from their power sources. A second class of implantable pump devices contain internal power sources, commonly in the form of electrical batteries as in Harris U.S. Pat. No. 4,487,603. Internally powered implanted pump devices generally require sophisticated control mechanisms for regulating the pumping mechanism. Furthermore, the internal power sources take up a significant volume of space which could be advantageously used to store the liquid medicant.

SUMMARY OF THE INVENTION

It is an object of the present invention to dispense liquid drugs and other medicants by means of a muscle powered pumping mechanism which is independent of power sources outside the body in which the device is implanted, and which does not require an internal power source such as a battery.

It is a further object of this invention to provide a pumping mechanism which mixes multiple medicants immediately prior to their administration.

It is yet another object of this invention to provide a device which administers liquid medicants at a relatively constant rate.

Yet another object of the present invention is to provide an implanted muscle powered liquid medicant dispensing device which is usable in cooperation with an implanted anchor of the type disclosed in our related U.S. patent application Ser. No. 830,999.

These and other objects are provided by a muscle powered liquid dispensing insert usable with an implanted anchor having a hollow anchor sleeve extending into the subcutaneous fascia of an animal, said insert comprising one or more balloon-like reservoirs disposed below a lower end of the anchor sleeve, each such reservoir containing a drug or other medicant in substantially liquid form; a pump assembly positioned at the lower end of the anchor sleeve adjacent said one or more reservoirs, said pump assembly having a pump body defining a pump chamber and including a flexible impermeable pump diaphragm, said pump chamber communicating through separate inlet valve means with each of the one or more reservoirs, and through outlet valve means with the tissue of the animal, a piston having a piston head fixedly attached to the pump diaphragm, and a piston shaft fixedly attached to and depending from the piston head and extending downwardly to a lower end positioned adjacent a muscle of the animal, said piston being translated by movement of the animal's muscles so as to vary the volume of the pump chamber, and means biasing the piston in a direction which minimizes the volume of the pump chamber; and one or more tubes, each tube communicating through the interior of the anchor sleeve between an associated reservoir and a resealable accessible opening.

Other features and advantages of the present invention will become apparent from the following detailed description of a typical embodiment thereof taken in conjunction with the accompanying drawings.

BRIEF DESCRIPTION OF THE DRAWINGS

FIG. 1 is a longitudinal cross-section of the anchor and the liquid-dispensing insert of the present invention, shown in its state ready for insertion in the animal and before activation and introduction of the liquid medicants.

FIG. 2 is a longitudinal cross-section of the anchor and insert of FIG. 1, shown in the activated state with the reservoirs deployed.

FIG. 3 is an exploded isometric view of the plug, cap and spool of the insert of FIGS. 1 and 2.

DESCRIPTION OF THE PREFERRED EMBODIMENT

The liquid dispensing insert 10 of the present invention is preferably used in cooperation with an implanted anchor 2 of the type disclosed in U.S. patent application Ser. No. 830,999, of which the present application is a continuation-in-part. The anchor 2 holds the insert 10 securely in position and protects the insert from damage.

As disclosed in said related U.S. patent application Ser. No. 830,999, the anchor 2 is implanted in an animal through an incision in a target region located behind the animal's ear. The target region, commonly known as the Kelly triangle or cavity, is bounded cranially by the posterior border of the conchal cartilage and caudally by the anterior border of the cleidooccipitalis muscle, and comprises a substantially cylindrical volume greater than about one inch (2.5 cm) in diameter extending from the animal's skin downward into the subcutaneous fascia and fat and filled with soft moist tissue. The anchor 2 comprises a flange, a sleeve, healing material for promoting healing of the incision through which the anchor is placed, and barbs for retaining the anchor in the animal until the healing is completed. The anchor 2 is advantageously manufactured from a silicone rubber or like material, such as poly-dimethylsiloxane. The anchor flange is a flat, substantially rigid annular element positioned against the animal's skin. The flange prevents excessive penetration of the anchor 2 into the animal and provides a stable support for the insert 10. The anchor sleeve is a tubular element fixedly attached around the annular opening in the flange, and extending downward into the subcutaneous fascia of the target region. After the anchor 2 has been implanted in the animal, the healing material encourages attachment of the skin and subcutaneous fascia thereto. When this healing is complete, the anchor 2 is effectively a part of the animal and cannot be removed without injury. While the healing process is underway, the barbs retain the anchor 2 in the animal. Once the incision has compeltely healed around the healing material, the barbs become superfluous. Implantation can be aided by the use of means for preventing foreign substances from migrating through the incision into the animal, such as the foam-like material disclosed in Kelly et al. U.S. Pat. No. 4,245,652.

Figure 7:
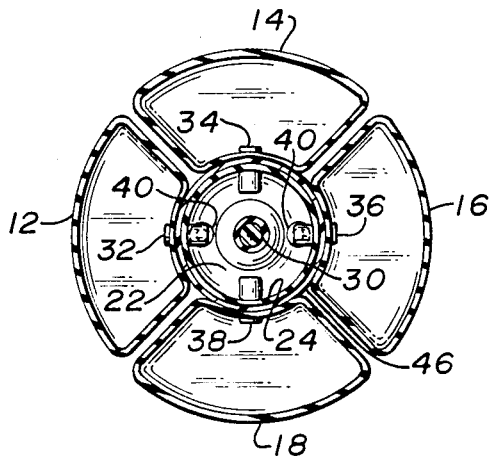
FIG. 7 is a transverse cross-section of the lower portion of the pump assembly and the reservoirs, taken along line 7—7 of FIG. 2.

As best seen in longitudinal cross-section in FIGS. 1 and 2 and in transverse cross-section in FIG. 7, the insert 10 comprises four balloon-like reservoirs 12,14,16,18 each containing a drug or other medicant in liquid form, and a pump assembly 20 for drawing liquid medicant from the reservoirs and mixing and dispensing the resulting mixture to the animal at a relatively constant rate. The reservoirs 12,14,16,18 are quadrantly disposed around the central pump assembly 20. Each reservoir comprises a strong, flexible, expandable, impermeable balloon-like membrane. The reservoirs can all contain the same medicant, or they can advantageously contain binary or other multiple medicants such as the separate components of a multiple component drug.

The pump assembly 20 comprises a substantially toroidal pump chamber 22 defined by a pump body 24 including a flexible impermeable pump diaphragm 26, a piston having a piston head 28 and a piston shaft 30, four inlet check valves 32,34,36,38 each communicating between the pump chamber and an associated one of the reservoirs 12,14,16,18, and two outlet check valves 40. The piston head 28 is operatively connected to the pump diaphragm 26 such that movement of the piston head causes the volume of the pump chamber 22 to significantly increase or decrease. In the intake stroke, the piston head 28 is moved so as to increase the volume of the pump chamber 22, thereby progressively decreasing the pressure within the pump chamber until the inlet valves 32,34,36,38 open allowing the several liquid medicants to flow from their respective reservoirs 12, 14,16,18 into the pump chamber and be mixed therein. In the outflow stroke, the piston head 28 is moved so as to decrease the volume of the pump chamber 22, progressively increasing the pressure within the pump chamber until the outlet valves 40 open allowing the final mixture of medicants to flow out from the pump chamber and thereby be administered to the animal.

The pump assembly 20 is powered and operated solely by movement of the animal's muscles, allowing the insert 10 to operate continuously without any other power source. This muscle powered pump assembly 20 makes the insert 10 particularly suited to use in livestock and other animals which are allowed to wander without direct human supervision for extended periods.

A peripheral portion of the circular disc-like piston head 28 is fixedly attached to the pump diaphragm 26. The piston shaft 30 is fixedly attached to and depends downwardly from the central portion of the piston head 27 through the central opening of the toroidal pump chamber 22. The piston shaft 30 terminates in a distal end located a significant distance below a lower portion of the pump body 24. A disc-like pad 42 fixedly attached to the distal end of the piston shaft 30 and having a diameter at least about three times greater than the diameter of the piston shaft increases the contact area between the piston shaft and the tissues and muscles underlying the target region, such as the splenius muscle.

A piston spring 44 operatively positioned against the piston head 28 biases the piston head toward movement of the pump diaphragm 26 downwardly, minimizing the volume of the pump chamber 22. Thus the intake stroke of the pump assembly 20 is powered primarily by the animal's muscles, causing longitudinal or transverse movement, or both, of the piston shaft 30. The outflow stroke completing the pumping cycle is performed by the piston spring 44 which was compressed during the previous intake stroke. Although the piston head 28 can be biased to either minimize or maximize the volume of the pump chamber 22, the use of a downward, minimizing bias is preferred in order to reduce the retention time of the mixed medicants in the pump chamber prior to their administration to the animal during the outflow stroke.

The pump assembly 20 is encircled by a substantially rigid, cylindrical vertical wall 46 separating the pump assembly from the reservoirs 12,14,16,18. A similarly rigid, circular horizontal plate 48 fixedly attached around the upper circumferential end of said wall 46 supports the upper end of the piston spring 44 to ensure compression of said spring between the plate and the piston head 28 during the intake stroke of the pumping cycle.

The cylindrical wall 46 is sandwiched between the outermost substantially vertical portion of the pump body 24 and the innermost substantially vertical portions of the reservoirs 12,14,16,18. The wall 46 is pierced by a plurality of slotted openings 50 which allow the inlet valves 32,34,36,38 to extend between their respective reservoirs and the pump chamber 22. As best seen in the isometric view of FIG. 3, the slotted openings 50 extend upwardly from the lower circumferential end of the wall 46 about one third the vertical height of the wall, and are of a width sized to snugly accept and hold in place the inlet valves 32,34,36,38.

Figure 5:
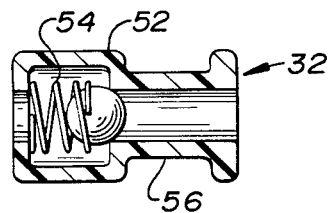
FIG. 5 is a longitudinal cross-section of the inlet valve of the insert of FIGS. 1 and 2.

The inlet check valves 32,34,36,38 allow liquid to flow from their associated reservoirs 12,14,16,18 into the pump chamber 22, but prevent backflow from said pump chamber into said reservoirs. The inlet check valves 32,34,36,38 are suitable conventional ball and spring check valves which allow flow in the desired direction only when the pressure in the valve's associated reservoir exceeds the pressure in the pump chamber 22 by at least a preselected inlet activation pressure. As seen in the longitudinal cross-section of typical inlet valve 32 in FIG. 5, each inlet valve comprises a cylindrical inlet valve casing 52 enclosing an inlet valve ball and an inlet valve spring 54. A circumferential groove 56 around the outer surface of the inlet valve casing 52 is suitably dimensioned to securely hold the innermost substantially vertical portion of the reservoir associated with said inlet valve and the outermost substantially vertical portion of the pump body 24 against the wall 46, fastening the reservoir to the wall and providing a reliable, pressure-resistant seal between the valve and the pump body, and between the valve and its associated reservoir.

The outlet check valves 40 allow flow out from the pump chamber 22 only when the pressure therein exceeds the pressure (if any) in the volume between the insert 10 and the animal's tissues by at least a preselected outlet activation pressure. The outlet activation pressure of the outlet valves 40 is preferably substantially greater than the inlet activation pressure of the inlet valves 32,34,36,38 in order to prevent the pressure in the reservoirs 12,14,16,18 alone from forcing the mixed medicants out of the pump chamber 22, thus insuring that the medicants are administered to the animal at a relatively constant, metered rate solely by operation of the pump assembly 20. This metering of the medicant flow is a principal feature of the present invention.

Figure 6:
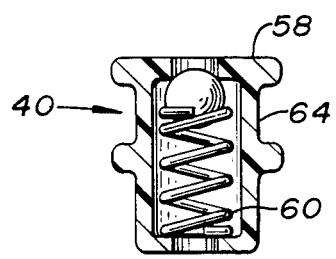
FIG. 6 is a longitudinal cross-section of the outlet valve of the insert of FIGS. 1 and 2.

As seen in longitudinal cross-section in FIG. 6, the outlet check valves 40 are suitably substantially similar to the inlet check valves 32,34,36,38. Each outlet check valve 40 is a conventional ball and spring check valve having a cylindrical outlet valve casing 58 enclosing an outlet valve ball and an outlet valve spring 60. The outlet valve spring 60 is suitably stiffer than the inlet valve springs 54 in order that the outlet activation pressure is greater than the inlet activation pressure by a selected amount. Each outlet valve 40 is fixedly attached to a lower portion 62 of the pump body 24 by a circumferential groove 64 in the outer surface of the outlet valve casing 58. The outlet valve groove 64 is suitably dimensioned to securely grip the lower portion of the pump body 24 and provide a reliable, pressure-resistant seal between the valve and the pump body. The lower portion 62 of the pump body 24 is substantially thicker and more rigid than the remainder of the pump body in order to prevent said lower portion from bulging downwardly under the increased pressure in the pump chamber 22 during the outflow stroke and thereby substantially reducing the effectiveness of the pump assembly 20.

It is to be understood that alternative check valve designs such as flap valves may be used instead of the ball and spring valves described herein. However, flap valves are considered inferior to ball valves in this application because the inlet and outlet activation pressures of ball valves can be selected more precisely, and because ball valves are significantly more reliable in operation. It is to be further understood that suitable semi-permeable membranes may be used instead of the inlet or outlet check valves, or both, described above.

When used in cooperation with the anchor 2 described above, the reservoirs 12,14,16,18 and the pump assembly 20 are disposed immediately below the lower end of the anchor sleeve, with the pump assembly substantially centered on the longitudinal axis of the anchor sleeve and with the reservoirs extending laterally outward a significant distance beyond the outer diameter of said sleeve, and preferably for a distance substantially greater than the lateral extension of the barbs beyond the sleeve. This lateral extension of the reservoirs 12,14,16,18 provides an additional effective means of anchoring the insert 10 and anchor 2 in place in the animal.

The useful life of the insert 10 can be extended nearly indefinitely by providing means for refilling the reservoirs 12,14,16,18 with their respective liquid medicants. As best seen in FIG. 2, a tube 66 extends from each of the four reservoirs 12,14,16,18 upwardly through the hollow interior of the anchor sleeve. Each tube terminates at an upper accessible end closed by a resealable tube plug 68. A selected one of the reservoirs 12,14,16,18 may be refilled by inserting a hollow needle attached to a syringe filled with the appropriate medicant through the tube plug 68 of the tube 66 associated with said reservoir, and forcing the medicant from the syringe through the tube and into the reservoir. Their balloon-ike configuration allows the reservoirs 12,14,16,18 to expand as needed to accept the new medicant. The tube plugs 68 comprise a soft flexible compliant self-sealing material which prevents the medicant from leaking through the tube plug when refilling is complete. The tubes 66 and tube plugs 68 can be formed as an integral unit, as can the tubes 66 and reservoirs 12,14,16,18. Any or all of the reservoirs 12,14,16,18, the tubes 66 and the tube plugs can be manufactured from a suitable silicone rubber material such as polydimethylsiloxane.

Figure 4:
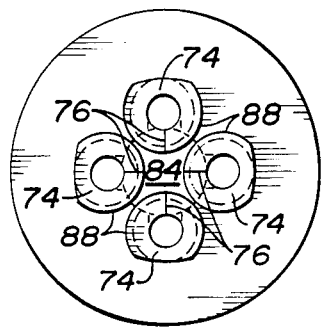
FIG. 4 is a bottom plan view of the cap of the insert of FIGS. 1 and 2.

A cap 70 accepts and supports the upper accessible ends of the tubes 66 and prevents the entry of contaminants and other foreign material into the interior of the anchor sleeve. The circular disc-like cap 70 is formed of a relatively flexible, resilient material such as silicone rubber, and has a convex upper surface and a substantially flat lower surface. Four tube holes 72 extend between the upper and lower surfaces of the cap 70, each such tube hole accepting the upper accessible end of one of the four tubes 66. The tube holes 72 are positioned quadrantly around the cap 70 about midway between the longitudinal axis and the perimeter of said cap. Four substantially cylindrical tube sleeves 74 axially aligned with the tube holes 72 are fixedly attached to the lower surface of the cap 70 and depend therefrom downwardly into the interior of the anchor sleeve, providing additional support for the upper ends of the tubes 66, and further sealing the interior of the anchor sleeve. The outer surfaces of the tube sleeves 74 proximally contact the inner surface of the anchor sleeve when the cap 70 is in place. Radial slits 76 in the tube sleeves 74, best seen in the bottom plan view of FIG. 4, facilitate the insertion of the tubes 66 into the tube sleeves during manufacturing of the insert 10. The slits 76 extend upwardly from the lower end of the tube sleeves 74 for a predetermined distance (see FIG. 2).

A spool 78 extending axially within the achor sleeve between the cap 70 and the plate 48 above the piston spring 44 positions and supports said plate within the lower end of the anchor sleeve, and supports the cap and the tube sleeves 74 at the upper end of the anchor sleeve. As best seen in FIG. 3, the spool 78 comprises a shaft 80 and a spacer 82. The rigid, relatively slender, cylindrical shaft 80 is fixedly attached to the circular plate 48 at the center thereof, and extends upwardly from the plate through the spacer 82 and through a central opening 84 in the cap 70, terminating substantially flush with the upper surface of the cap. The outer diameter of the substantially rigid, solid cylindrical spacer 82 is equal to the inner diameter of the anchor sleeve. The spacer 82 is substantially equal in length to the length of the tube sleeves 74, and has four quadrantly positioned longitudinal slots 86 which accept the tube sleeves 74. The slots 86 of the spacer 82 extend inwardly from the outer surface of the spacer for a distance about equal to the outer diameter of the tube sleeves 74. That portion of each slot 86 closest to the longitudinal axis of the spacer 82 forms a semi-cylindrical surface having a diameter about equal to the outer diameter of one of the tube sleeves 74. From this semi-cylindrical centermost portion, the sides of each slot 86 continue parallel outwardly to the outer surface of the spacer 82, separated by a distance equal to the diameter of said semi-cylindrical centermost portion of the slot. A circular lip 88 around the central portion of the lower end of each tube sleeve 74 extends over the lower surface of the spacer 82 for a small distance beyond the edge of the slot 86 to prevent movement of said lower end of the tube sleeve upwardly toward the cap 70. A circumferential groove 90 in the outer surface of the spacer 82, and an interfitting ridge 92 disposed around the inner surface of the anchor sleeve securely hold the spool 78 in place.

A hollow cylindrical cap plug 94 fits into and fills the volume in the central opening 84 of the cap 70 between the shaft 80 and the surface of said opening. A circular lip 96 extending radially outward from the upper end of the cap plug 94 for a predetermined small distance provides a complete seal around the central opening 84 of the cap 70. Four quadrantly located rounded cutouts 98 in the edge surface of the lip 96 of the cap plug 94 accept those portions of the resealable tube plugs 68 which extend into the central opening 84 of the cap 70. In the event that the insert 10 requires replacement, the insert can be withdrawn from the anchor 2 by removing the cap plug 94, gripping the upper portion of the shaft 80 with a suitable tool, and extracting the insert while manually holding the anchor in place.

As best seen in FIG. 1, the insert 10 is designed and sized such that the reservoirs 12,14,16,18 and the pump assembly 20 fit within the inner end of the anchor sleeve prior to and during implantation of the anchor 2 and insert 10 in the animal, with the collapsed, empty reservoirs 12,14,16,18 tightly packed between the wall 46 surrounding the pump assembly 20 and the inner surface of the anchor sleeve. After implantation, the insert 10 is activated by manually translating the entire insert downwardly until the reservoirs 12,14,16,18 are no longer confined within the anchor sleeve and can expand freely. The interfitting groove 90 and ridge 92 effectively secure the insert 10 in the proper position relative to the anchor 2. Downward movement of the insert 10 is further prevented by engagement of a peripheral portion of the cap 70 against the surface of the anchor flange. Administration of medicants to the animal begins when the reservoirs are filled by means of the tubes 66, allowing the pumping assembly 20 to dispense the medicants to the animal at a relatively constant metered rate.

An alternative embodiment of the insert having an air bladder system can be used to augment the pressure in the reservoirs, if desired. For example, a toroidal air pumping chamber may be disposed around the piston spring 44 between the piston head 30 and the plate 48, said air pumping chamber taking in air through an air filter positioned at the cap 70 and through an air induction tube having an air pressure limiting check valve, and inflating an air bladder located within each of the reservoirs through an associated tube and check valve in said tube. The air pressure limiting check valve comprises a mitral check valve with pressure relief openings. The mitral check valve is a hollow substantially conical element fixedly attached to the inner surface of the tube and oriented with the apex pointed downstream in the direction of the desired air flow. One or more longitudinal slits at the apex of said conical element create a plurality of mitral flaps therein which open to allow air flow when the pressure upstream of the valve exceeds the pressure downstream therefrom by at least a desired level, and close to prevent backflow when the upstream pressure drops below said desired level. One or more pressure relief holes extending through the conical element near the base thereof relieve excessive downstream pressure. When the downstream pressure is less than the upstream pressure or exceeds said upstream pressure by less than a selected critical level, the conical element is expanded radially outwardly against the tube, sealing the pressure relief holes against the inner surface of the tube. When the backpressure exceeds such critical level, such backpressure partially collapses the conical element, exposing the open pressure relief holes and relieving the excessive backpressure.

Although the presently preferred embodiment as described above comprises four medicant reservoirs, it will be readily understood that inserts according to the present invention can be constructed with one or any desired number of reservoirs.

The anchor 2 described above and disclosed as the preferred embodiment in our related U.S. patent application Ser. No. 830,999 comprises a plurality of upwardly pointing barbs formed integrally with the lower portion of the anchor sleeve. However it is to be understood that other configurations and designs of barbs are contemplated. For instance, the barbs can be formed from a suitable plastic or from stainless steel, and could be either molded in place or fixedly attached subsequent to molding of the anchor sleeve. Alternatively, the barbs can be located within the anchor sleeve during implantation of the anchor, and subsequently be laterally or rotationally extended therefrom into the subcutaneous fascia of the animal, such as during activation of an insert within the anchor.

Yet another alternative insert is contemplated, said alternative insert having only one or more reservoirs and a pumping assembly. This alternative insert can suitably be completely implanted in the animal, being retained therein solely by means of the expanded reservoir(s). Such an alternative embodiment of the insert is suitable for applications where access to the implant subsequent to implantation is unnecessary, such as in livestock being prepared for impending slaughter.

It will therefore be appreciated that, although specific embodiments of the invention have been described herein for purposes of illustration, various modifications may be made without departing from the spirit and scope of the invention. Accordingly, the scope of the invention is not limited except as by the following claims.

What is claimed is:

1. A muscle powered liquid drug delivery device implanted in the region behind an animal's ear bounded cranially by the posterior border of the conchal cartilage, caudally by the anterior border of the cleidooccipitalis muscle, and medially by the splenius muscle, said device comprising:

(a) balloon-like reservoir means including a plurality of balloon-like reservoirs, said reservoir means in expanded condition aiding in anchoring the device in the animal; and (b) pump means having inlet means in fluid communication with each of said reservoirs and outlet means in fluid communication with the adjacent tissue of the animal, said pump means including a pump body defining a pump chamber and including a flexible impermeable pump body, said pump chamber communicating through inlet valve means with the reservoir means, and through outlet valve means with the animal's tissue surrounding the device, a piston having a piston head fixedly attached to an upper portion of the pump body, a piston shaft fixedly attached to and depending from the piston head and extending downwardly to a lower end positioned adjacent the animal's splenius muscle, said lower end and in turn the piston being translated by movement of the animal's muscles and tissues to vary the volume of the pump chamber, and means biasing the piston in a direction which minimizes the volume of the pump chamber, said pump means further including compressive means actuating flow of fluid therethrough responsive to flexure of the animal's muscles and tissues surrounding and underlying said region, whereby the liquids from the reservoirs are mixed in said pump means.

2. A muscle powered liquid dispensing insert for use with an implanted anchor having a hollow anchor sleeve extending into the subcutaneous fascia of an animal, comprising:

(a) one or more balloon-like reservoirs disposed below a lower end of the anchor sleeve, each such reservoir containing a drug or other medicant in substantially liquid form;

(b) a pump assembly positioned at the lower end of the anchor sleeve adjacent said one or more reservoirs, said pump assembly having:

(i) a pump body defining a pump chamber and including a flexible impermeable pump diaphragm, said pump chamber communicating through separate inlet valve means with each of the one or more reservoirs, and through outlet valve means with the tissue of the animal, (ii) a piston having
  (A) a piston head fixedly attached to the pump diaphragm,
  (B) a piston shaft fixedly attached to and depending from the piston head and extending downwardly to a lower end positioned adjacent a muscle of the animal, said piston being translated by movement of the animal's muscles so as to vary the volume of the pump chamber, and
  (C) means biasing the piston in a direction which minimizes the volume of the pump chamber; and (c) one or more tubes, each tube communicating through the interior of the anchor sleeve between an associated reservoir and a sealable accessible opening.

3. The insert of claim 2, wherein the anchor is implanted in a region behind the animal's ear bounded cranially by the posterior border of the conchal cartilage, caudally by the anterior border of the cleidooccipitalis muscle, and medially by the splenius muscle.

4. The insert of claim 2 comprising two or more balloon-like reservoirs, wherein the pump chamber mixes the substantially liquid medicants or other drugs contained in the reservoirs.

5. The insert of claim 2, wherein the one or more reservoirs extend laterally outwardly beyond the anchor sleeve a sufficient distance to provide effective additional means anchoring the anchor and insert in the animal.

6. The insert of claim 2, further including a substantially rigid cylindrical wall encircling the pump body and being fixedly attached to at least part of an inner surface of each of the one or more reservoirs.

7. The insert of claim 2, wherein the pump body comprises a substantially toroidal surface, and wherein the lower portion of the pump body is substantially less flexible than the pump diaphragm.

8. The insert of claim 2, further including a disc-like pad fixedly attached to the lower end of the piston shaft, said pad having a diameter at least about three times the outer diameter of the piston shaft.

9. The insert of claim 2, wherein the inlet valve means comprises one or more ball-type check valves, each such inlet check valve permitting flow from its associated reservoir through said valve into the pump chamber only when the pressure in said reservoir exceeds the pressure in the pump chamber by at least a predetermined inlet activation pressure.

10. The insert of claim 2, wherein the outlet valve means comprises one or more ball-type check valves permitting flow from the pump chamber through the one or more outlet check valves to the animal's tissues oly when the pressure in the pump chamber exceeds the pressure in the volume between the insert and the animal's tissue by at least a predetermined outlet activation pressure.

11. The insert of claim 10, wherein the inlet valve means comprises one or more ball-type check valves, each such inlet check valve permitting flow from its associated reservoir through said valve into the pump chamber only when the pressure in said reservoir exceeds the pressure in the pump chamber by at least a predetermined inlet activation pressure which is substantially lower than the outlet activation pressure of the outlet valves.

12. The insert of claim 2, further including sealing means for preventing the entry of foreign matter into the interior of the anchor through spaces between the access openings of the tubes.

13. The insert of claim 12, wherein the sealing means comprises:

(a) a cap covering a peripheral portion of an upper opening of the anchor sleeve, said cap having one or more holes extending between opposite surfaces thereof, each such hole accepting an upper portion of one of the tubes, and (b) a cylindrical plug covering a central portion of the upper opening of the anchor sleeve not covered by the sealing cap, wherein the sealing cap and plug completely seal the area within the upper opening of the anchor sleeve.

14. The insert of claim 13, wherein the sealing cap includes one or more flexible tube sleeves axially aligned with and having substantially the same inner diameter as the tube holes of the cap, each of said tube sleeves fixedly attached to and depending from the cap into the interior of the anchor sleeve, each tube sleeve accepting an additional portion of the upper end of an associated one of the one or more tubes.

15. The insert of claim 14, wherein the sealing cap and the one or more tube sleeves form an integral unit constructed of a relatively soft flexible compliant material, and wherein a longitudinal slit extends along the length of each tube sleeve.

16. The insert of claim 15, wherein the sealing means can be at least partially removed to allow the insert to be removed from the anchor by means of a suitable tool.

17. In combination with an implanted anchor having a flat anchor flange positionable adjacent the surface of the animal's skin, an anchor sleeve fixedly attached around an opening of the anchor flange and extending therefrom into the animal, healing material disposed around an upper portion of the anchor sleeve, said healing material aiding the healing of the animal's tissue and growth of said tissue to the healing material, and one or more upwardly and outwardly projecting barbs disposed around a lower portion of the sleeve, a muscle powered liquid dispensing insert comprising:
(a) one or more balloon-like reservoirs disposed below a lower end of the anchor sleeve, each such reservoir containing a drug or other medicant in substantially liquid form;
(b) a pump assembly positioned at the lower end of the anchor sleeve adjacent said one or more reservoirs, said pump assembly having:
  (i) a pump body defining a pump chamber and including a flexible impermeable pump diaphragm, said pump chamber communicating through separate inlet valve means with each of the one or more reservoirs, and through outlet valve means with the tissue of the animal,
  (ii) a piston having
    (A) a piston head fixedly attached to the pump diaphragm,
    (B) a piston shaft fixedly attached to and depending from the piston head and extending downwardly to a lower end positioned adjacent the animal's splenius muscle, said piston being translated by movement of the animal's splenius muscle and tissues so as to vary the volume of the pump chamber, and
    (C) means biasing the piston in a direction minimizing the volume of the pump chamber; and
(c) one or more tubes, each tube communicating through the interior of the anchor sleeve between an associated reservoir and a sealable accessible opening.

18. A liquid drug delivery system comprising:
(a) an implanted anchor having a flat anchor flange positioned adjacent the surface of the animal's skin, an anchor sleeve fixedly attached around an opening of the anchor flange and extending therefrom into the animal, healing material disposed around an upper portion of the anchor sleeve, said healing material aiding healing of the animal's tissue and growth of said tissue to the healing material, and barb means disposed around the sleeve; and
(b) a muscle powered insert having one or more balloon-like reservoirs disposed below a lower end of the anchor sleeve and containing one or more drugs or other medicants in substantially liquid form; a pump assembly positioned at the lower end of the anchor sleeve adjacent said one or more reservoirs, said pump assembly having a pump body defining a pump chamber and including a flexible impermeable pump diaphragm, said pump chamber communicating through separate inlet valve means with each of the one or more reservoirs, and through outlet valve means with the tissue of the animal, a piston having a piston head fixedly attached to the pump diaphragm, a piston shaft fixedly attached to and depending from the piston head and extending downwardly to a lower end positioned adjacent the animal's muscles, said piston being translated by movement of the animal's muscles and tissues so as to vary the volume of the pump chamber, means biasing the piston in a direction which minimizes the volume of the pump chamber, and one or more tubes, each tube communicating through the interior of the anchor sleeve between an associated reservoir and a sealable access opening.

* * * * *